United States Patent
Jiang

(10) Patent No.: US 7,801,142 B2
(45) Date of Patent: Sep. 21, 2010

(54) METHOD TO AVOID POTENTIAL DEADLOCKS IN A SDU DISCARD FUNCTION

(75) Inventor: Sam Shiaw-Shiang Jiang, Hsinchu (TW)

(73) Assignee: Innovative Sonic Limited, offshore incorporations centre, Road Town, Tortola (VG)

( * ) Notice: Subject to any disclaimer, the term of this patent is extended or adjusted under 35 U.S.C. 154(b) by 1115 days.

(21) Appl. No.: 10/918,486

(22) Filed: Aug. 16, 2004

(65) Prior Publication Data

US 2005/0041663 A1 Feb. 24, 2005

Related U.S. Application Data

(60) Provisional application No. 60/495,705, filed on Aug. 18, 2003.

(51) Int. Cl.
*H04L 12/56* (2006.01)
(52) U.S. Cl. .................................. 370/394; 370/473
(58) Field of Classification Search ................ 370/232, 370/236, 252, 253, 338, 349, 469, 471, 229, 370/230.1, 310.1, 412, 230, 235, 310, 350, 370/389, 394, 395.1, 473; 455/426.2, 422.1, 455/424, 412, 412.2
See application file for complete search history.

(56) References Cited

U.S. PATENT DOCUMENTS 7,054,270 B2 * 5/2006 Yi et al. .................... 370/232

| | | | |
|---|---|---|---|
| 2002/0048281 A1 * | 4/2002 | Yi et al. ............... | 370/474 |
| 2002/0090005 A1 | 7/2002 | Jiang et al. | |
| 2003/0095519 A1 * | 5/2003 | Kuo et al. ............. | 370/338 |
| 2004/0009771 A1 * | 1/2004 | Leppanen et al. ..... | 455/426.2 |
| 2006/0098574 A1 * | 5/2006 | Yi et al. ............... | 370/236 |

FOREIGN PATENT DOCUMENTS

| | | |
|---|---|---|
| CN | 1348316 | 5/2002 |
| CN | 1354930 | 6/2002 |
| EP | 1198107 A2 | 4/2002 |
| EP | 1333609 | 1/2003 |
| EP | 1333609 A1 | 8/2003 |
| KR | 2002-0014940 | 2/2002 |
| KR | 2003-0017953 | 3/2003 |
| WO | WO 02/15510 A2 * | 2/2002 |

(Continued)

OTHER PUBLICATIONS

3GPP, UMTS RLC Protocol Specification, ETSI TS 125 322 v3.15.0, Jun. 2006.*

(Continued)

*Primary Examiner*—Aung S Moe
*Assistant Examiner*—Habte Mered
(74) *Attorney, Agent, or Firm*—Winston Hsu

(57) ABSTRACT

Several methods to avoid potential deadlocks in a SDU discard function are disclosed. First, the decision rule of deciding discarded SDUs in a SDU discard function is modified. Consideration of the Length Indicator is added to the decision of discarded SDUs in a SDU discard function to completely cover the SDU set that should be discarded. Secondly, the status-formatted padding PDU is chosen when padding PDUs is needed. Finally, modified explicit SDU discarding SUFI to cover scenarios that cannot be handled by the conventional MRW SUFI is utilized.

6 Claims, 8 Drawing Sheets

FOREIGN PATENT DOCUMENTS

WO        WO-02/15510 A2        2/2002

OTHER PUBLICATIONS

"Universal Mobile Telecommunications System (UMTS); Radio Link Control (RLC) Protocol Specification (3GPP TS 25.322 version 4.3.0 Release 4)," ETSI TS 125 322 V4.3.0, Dec. 2001, pp. 51-70, XP002902277.

Enderle et al: "Radio Link Control-Acknowledged Mode protocol performance modeling in units," Mobile and Wireless Communications Network, 2002, IEEE, Sep. 9, 2002, pp. 332-336.

Jose Luis Gonzalez-Sanchez et al: "TAP: Architecture for Trusted Transfers in ATM Networks With Active Switches," IEEE, Jun. 26, 2000, pp. 105-112, XP001075692.

3GPP TS 25.322 v 4.9.0 "3rd Generation Partnership Project; Technical Specification Group Radio Access Network; Radio Link Control (RLC) protocol specification" (Release 4), Jun. 2003.

* cited by examiner

METHOD TO AVOID POTENTIAL DEADLOCKS IN A SDU DISCARD FUNCTION

CROSS REFERENCE APPLICATION

This application claims priority from U.S. Provisional Patent Application Nos. 60/495,705 filed on Aug. 18, 2003.

BACKGROUND

The present invention relates to wireless communication and in particular to a method of avoiding potential deadlocks in a Service Data Unit (SDU) discard function for Acknowledged Mode transmission. An example of a conventional SDU discard function is described in 3GPP TS 25.322 V3.15.0 (2003-06), "Radio Link Control (RLC) protocol specification", called D1 hereafter.

A SDU in a sender is a data block submitted by upper layers to transfer to a peer receiver. SDUs may be segmented into several Radio Link Control layer protocol data units (RLC PDUs) of the same size. Two or more SDUs may also be concatenated within one PDU, depending on the sizes of SDUs and the length of PDUs. When the RLC entity is in acknowledged mode, the PDU is called acknowledged mod data PDU, abbreviated as AMD PDU hereafter.

FIG. 1 is an exemplary diagram of an AMD PDU. The AMD PDU (10) is used to transfer user data and other information. The length of the data part (16) shall be a multiple of 8 bits. The AMD PDU header consists of the first two octets, which contain the "Sequence number" (SN) (12). The RLC header consists of the first two octets and all the octets that contain "Length Indicators" (LI) (14). PAD (18) shown in FIG. 1 indicates padding, which is all the unused space in a PDU. PAD (18) may have any value filled by the Sender to keep the PDU with a pre-determined length. The receiver disregards the content of PAD (18). The HE field (13) and the E fields (15) are not directly related to the present invention so that they are not described herein.

A SDU discard function is used by the sender to discharge RLC PDUs from a RLC PDU buffer, when the transmission of the RLC PDUs does not succeed for a period of time (time-out discard) or for a maximum number of scheduled transmissions (maximum scheduled transmission discard). The time-out discard is not directly related to the present invention. Thus, only maximum scheduled transmission discard is described herein.

Maximum scheduled transmission discard function is enabled by configuring the flag "SDU discard after MaxDAT number of transmissions" to TRUE in D1. This function uses the number of times being scheduled for transmission of an AMD PDU, denoted as MaxDAT hereafter, as a trigger for SDU discard procedure, and is therefore only applicable for acknowledged mode RLC entity. After an AMD PDU has been transmitted for MaxDAT−1 times, if the AMD PDU is scheduled to transmission because of negative acknowledgement, the number of times of scheduled for transmission reaches MaxDAT so that SDUs having segments contained in this AMD PDU shall be discarded. Therefore, the maximum number of transmissions of an AMD PDU is equal to Max-DAT−1.

In acknowledge mode, when SDUs are discarded in a Sender, the information of the discarded SDUs are signaled to the peer receiver so that the receiver can stop receiving AMD PDUs carrying these SDUs and advance its receiving window accordingly. The sender uses a STATUS PDU containing a "Move Receiving Window" super-field (MRW SUFI) to request the receiver to move its receiving window and optionally to indicate the set of SDUs that should be discarded. The SDU discard signaling procedure is called an SDU discard with explicit signaling procedure.

FIG. 2 is a diagram showing the format of a conventional MRW SUFI. The MRW SUFI (20) contains a Type field (22) which indicates the SUFI is a MRW SUFI (20), a LENGTH field (24) indicating the number of SN_MRW$_i$ fields, several front SN_MRW$_i$ fields (26a, 26b, 26c) where i<LENGTH, a SN_MRW$_{LENGTH}$ field (26) which is the last of the SN_MRW$_i$ fields and a N$_{LENGTH}$ field (28). All fields in the MRW SUFI (20) except the SN_MRW$_{LENGTH}$ field (26) and the N$_{LENGTH}$ field (28) are not directly related to this invention and, hence, are not described herein. The N$_{LENGTH}$ field (28) is used together with the SN_MRW$_{LENGTH}$ field (26) to indicate the end of the last RLC SDU to be discarded in the Receiver. N$_{LENGTH}$ (28) indicates which "Length Indicator" in the AMD PDU with "Sequence Number" equal to SN_MRW$_{LENGTH}$ (26) corresponds to the last RLC SDU to be discarded in the Receiver. In particular, N$_{LENGTH}$=0 indicates that the last discarded SDU ended in the AMD PDU with "Sequence Number" equal to SN_MRW$_{LENGTH}$−1 and that the first data octet in the AMD PDU with "sequence Number" SN_MRW$_{LENGTH}$ is the first data octet to be reassembled next.

FIG. 3 is an exemplary diagram of two SDUs segmented and concatenated into three AMD PDUs for transmission from a peer sender to a peer receiver. Suppose "SDU discard after MaxDAT number of transmissions" is configured and MaxDAT=4. Suppose that the PDU with SN=0 (30) is positively acknowledged. Further suppose that PDU with SN=1 (32) has been transmitted three times and negatively acknowledged three times, i.e., the number of transmissions of this PDU (32) reaches its maximum allowed value. Therefore, the sender triggers a SDU discard procedure when the PDU (32) is scheduled for transmission when it is negatively acknowledged for the third time. Since Segment 2 of SDU 1 (32a) and Segment 1 of SDU 2 (32b) are included in PDU with SN=1 (32), both SDU 1 and SDU 2 have to be discarded. A MRW SUFI (20) can be constructed and sent to the Receiver.

FIG. 4 is an exemplary diagram of two SDUs carried by three AMD PDUs for transmission from a peer sender to a peer receiver. As shown in FIG. 4, the PDU with SN=1 (42) only consists of a Sequence Number (SN=1) (42a), a Length Indicator (LI=0000000) (42b) indicating that SDU1 ended in the previous PDU (40), a Length Indicator (LI=1111111) (42c) indicating that the remainder of the PDU is padding and PAD (42d) which is the padding itself. No data part or SDU segments are contained in the PDU with SN=1 (42). Suppose also that "SDU discard after MaxDAT number of transmissions" is configured and MaxDAT=4. The PDU with SN=0 (40) is positively acknowledged. Suppose that the PDU with SN=1 (42) has been transmitted three times and negatively acknowledged three times, i.e., the number of transmissions of this PDU (42) reaches its maximum allowed value. Therefore, the sender triggers a SDU discard procedure when this PDU (42) is scheduled for transmission when it is negatively acknowledged for the third time. However, since no SDU segments are included in the PDU with SN=1 (42), no SDU is to be discarded and a MRW SUFI cannot be constructed by the conventional SDU discard function. Consequently, the receiver will not move its receiving window beyond SN=1, while the sender is no longer allowed to retransmit the PDU with SN=1 (42). Both the transmission window at the Sender and the receiving window at the receiver are then blocked at SN=1. A deadlock happens.

Occasionally, lower layers would request PDUs to transmit on a physical layer while there are no PDUs left for transmission in the RLC entity. Under this circumstances, the RLC entity can submit padding PDUs to lower layers to respond to the request. There are two alternatives of the padding PDU in Acknowledged Mode RLC entities. A PDU is considered to be a padding PDU if it is an AMD PDU consisting only of an RLC Header with one "Length Indicator" indicating that the remainder of the PDU is padding and the padding itself. This first kind of padding PDU is called data-formatted padding PDU hereafter because its format is exactly the same as an AMD PDU, which contains data in general. A PDU shall also be considered to be a padding PDU if it is a STATUS PDU consisting only of a NO_MORE SUFI. The second kind of padding PDU is called status-formatted padding PDU because its format is the same as a STATUS PDU, which contains various super fields (SUFI) to provide RLC layer signaling such as acknowledgement, moving the receiving window, or reset. A STATUS PDU contains no sequence number and will not be explicitly acknowledged as received or missed. A NO MORE SUFI is the last SUFI within a STATUS PDU to indicate the end of the SUFIs contained in the STATUS PDU. Bit string after NO MORE SUFI is considered as padding. A STAUS PDU with NO MORE SUFI indicates that there are no RLC signaling messages contained in the STATUS PDU and, thus, the whole STATUS PDU can be used as a padding PDU. The RLC entity can freely choose to submit either data-formatted or status-formatted padding PDU when a padding PDU is needed.

FIG. 5 is an exemplary diagram of two SDUs and one data-formatted padding PDU for transmission from a peer sender to a peer receiver. As shown in FIG. 5, for a PDU with SN=1 (52), the Sender sends a data-formatted padding PDU, which consists of only an RLC Header with Sequence Number field (52a) and one Length Indicator (52b) indicating the remainder of the PDU is padding and PAD (52c) which is the padding itself. Suppose that "SDU discard after MaxDAT number of transmissions" is configured and MaxDAT=4. Suppose that the PDU with SN=0 (50) is positively acknowledged. Further suppose that the PDU with SN=1 (52) has been transmitted three times and negatively acknowledged three times, i.e., the number of transmissions of this PDU reaches its maximum allowed value. Therefore, the sender should trigger a SDU discard procedure. However, since there are no segments of SDUs included in PDU with SN=1 (52), no SDU is to be discarded according to the conventional SDU discard function. Thus, a MRW SUFI cannot be constructed and the receiver will not move its receiving window beyond SN=1 while the Sender is not allowed to retransmit the PDU with SN=1 again. Here, again, both the transmission window of the sender and the receiving window of the receiver will be blocked at SN=1 and a deadlock happens.

Unfortunately, the SDU discard function of the conventional method cannot resolve the previously mentioned deadlock problems.

SUMMARY

Accordingly, embodiments of the present invention provide methods to avoid potential deadlock situations from a SDU discard function of a sender.

First, the inventive method modifies the rule of deciding discarded SDUs of a SDU discard function. Consideration of the Length Indicator is added to the decision of discarded SDUs of a SDU discard function to cover the complete SDU set that should be discarded. Secondly, the status-formatted padding PDU is chosen when padding PDUs is needed. Furthermore, the invention utilizes modified explicit SDU discarding SUFI signaling to cover scenarios that cannot be handled by the conventional MRW SUFI.

BRIEF DESCRIPTION OF THE DRAWINGS

Embodiments of the invention can be more fully understood by reading the subsequent detailed description and examples with references made to the accompanying drawings, wherein.

DESCRIPTION

As summarized above, embodiments of the present invention disclose methods to avoid potential deadlock in a SDU discard function.

In one embodiment, a method for avoiding potential deadlock situations from a SDU discard function in a sender, wherein the SDU discard function uses the number of times being scheduled for transmission of a PDU as a trigger for SDU discard, is applicable for acknowledged mode RLC entities.

Figure 6:
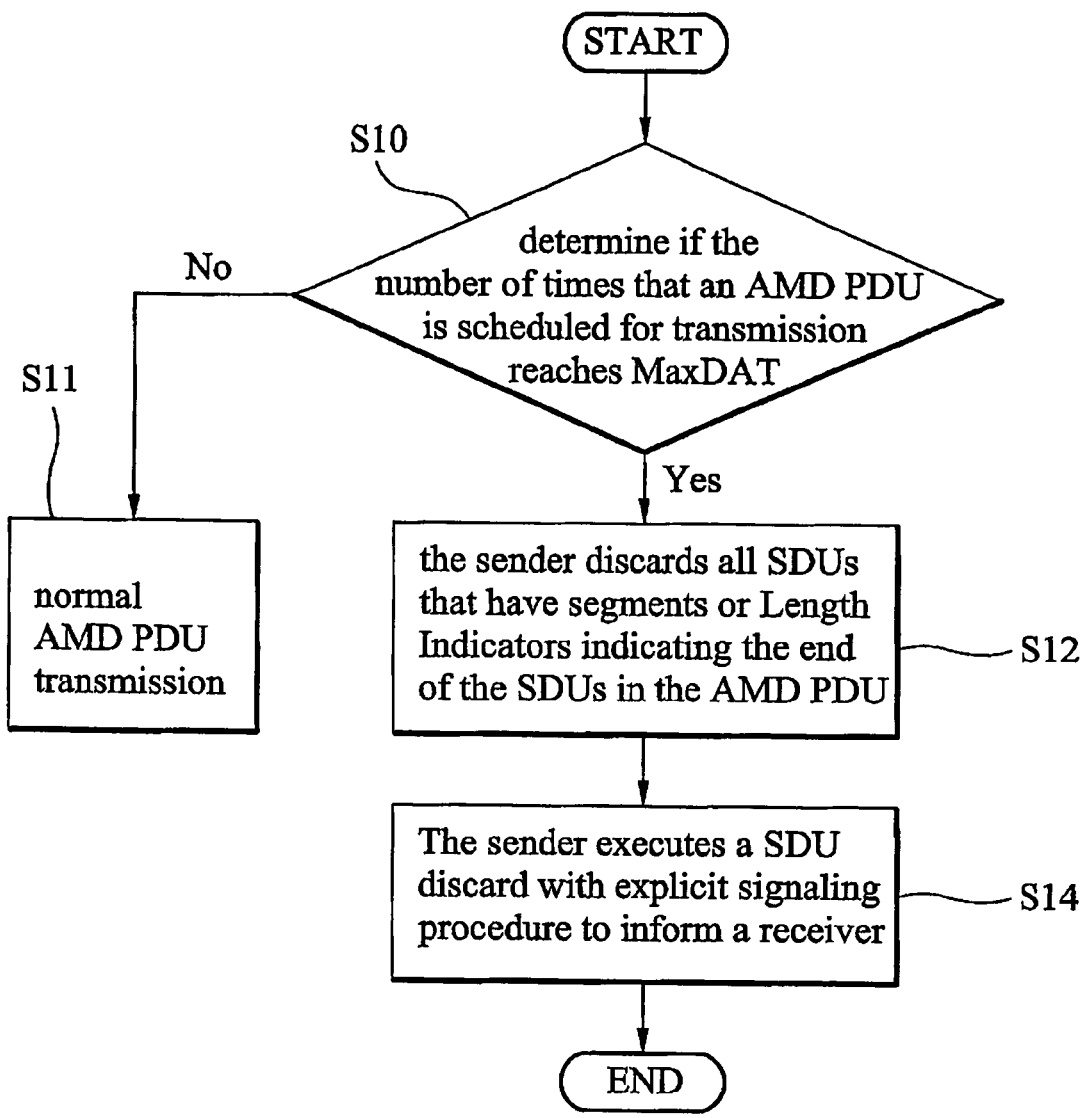
FIG. 6 is a flowchart showing the rule of deciding the discarded SDUs of the invention.

FIG. 6 is a flowchart of an embodiment of the invention for triggering a SDU discard procedure in a sender to determine the discarded SDUs directly because of reaching maximum number of times of being scheduled for transmission of an AMD PDU. In this embodiment, if the number of times that an AMD PDU is scheduled for transmission reaches MaxDAT (step S10), the sender discards all SDUs that have segments or Length Indicators indicating the end of the SDUs in the AMD PDU (step S12). The AMD PDU is called the provoking AMD PDU hereafter. The sender then executes a SDU discard with an explicit signaling procedure to inform a receiver (step S14). Else, if MaxDAT is not reached at step S10, proceed with the normal AMD PDU transmission (step S11). Here, MaxDAT indicates the maximum number of times scheduled for transmission of an AMD PDU. The Length Indicators are used to indicate the last octet of each RLC SDU ending within a PDU.

Figure 7:
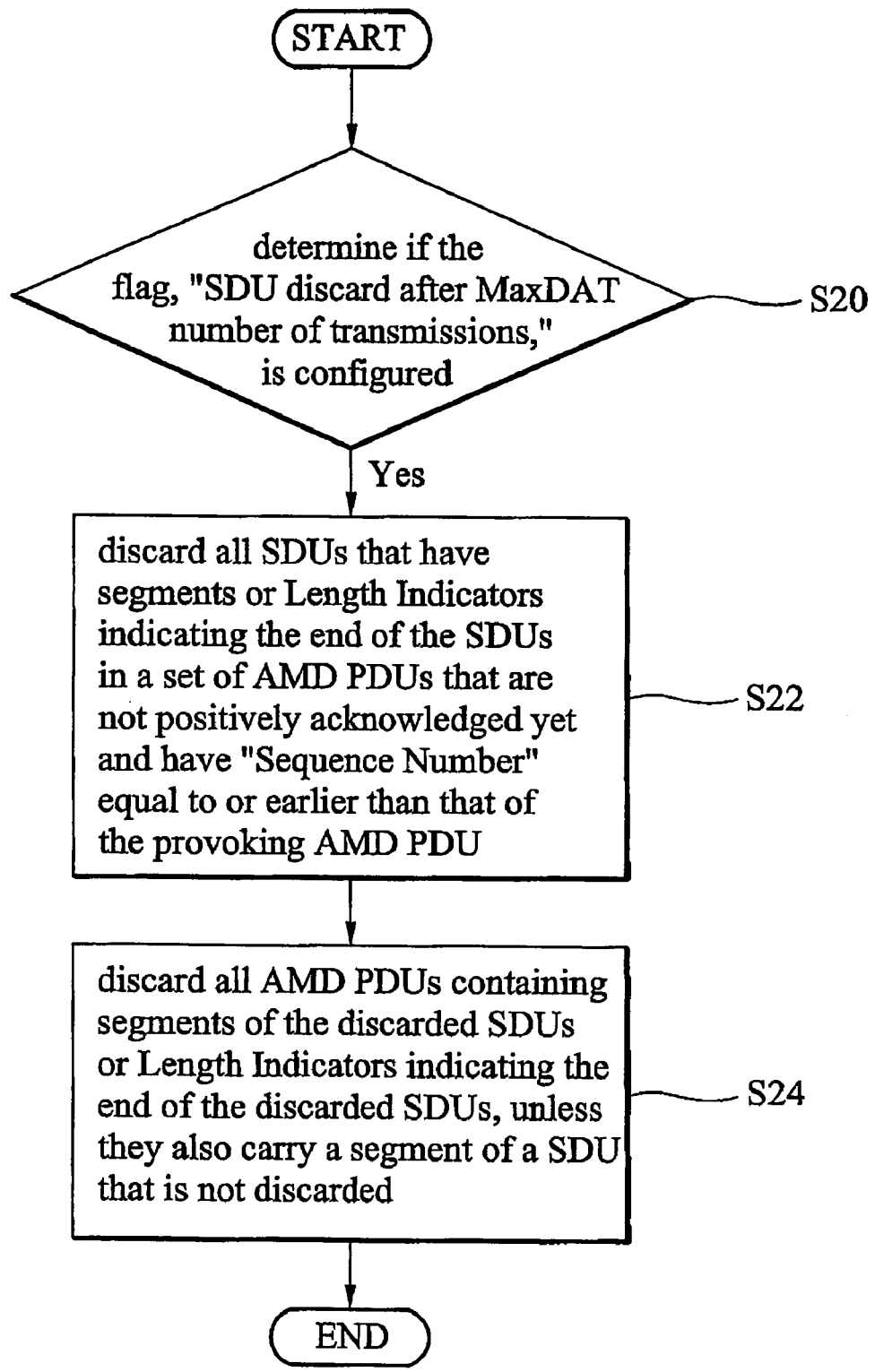
FIG. 7 is a flowchart of an initialization procedure for a SDU discard function of the invention.

The SDU discard with explicit signaling procedure further comprises an initialization procedure to determine the full set of discarded SDUs and the corresponding set of PDUs to be discarded. FIG. 7 is a flowchart of an initialization procedure for a SDU discard function in a sender by the present invention. During the initialization procedure of the SDU discard with explicit signaling procedure, the sender first determines if a flag, "SDU discard after MaxDAT number of transmissions," is configured (step S20). If so, the sender further discards all the SDUs that have segments or Length Indicators indicating the end of the SDUs in a set of AMD PDUs that are not positively acknowledged yet and have "Sequence Number" equal to or earlier than that of the provoking AMD PDU (step S22). The sender also discards all AMD PDUs containing segments of the discarded SDUs or Length Indicators indicating the end of the discarded SDUs, unless they also carry a segment of a SDU that is not discarded (step S24).

As previously mentioned, by this embodiment of the present invention, SDU having only Length Indicators in the provoking PDU is in the list of discarded SDUs. Thus, in the example shown in FIG. 4, SDU 1. (40a) is in the discard list. A MRW SUFI can be constructed accordingly. Consequently, the SDU discard procedure works properly so that the Receiver can move its receiving window beyond SN=1 and avoid potential deadlock problems.

Moreover, a second embodiment of the present invention to avoid potential deadlocks in a SDU discard procedure utilizes a method of choosing the format of a padding PDU, wherein the SDU discard procedure uses the number of times of being scheduled for transmission of an AMD PDU as a trigger. In this embodiment, the RLC entity chooses a status-formatted padding PDU if a padding PDU is needed when a flag, "SDU discard after MaxDAT number of transmissions," is configured. The status-formatted padding PDU consists of only a NO_MORE super-field.

Figure 5:
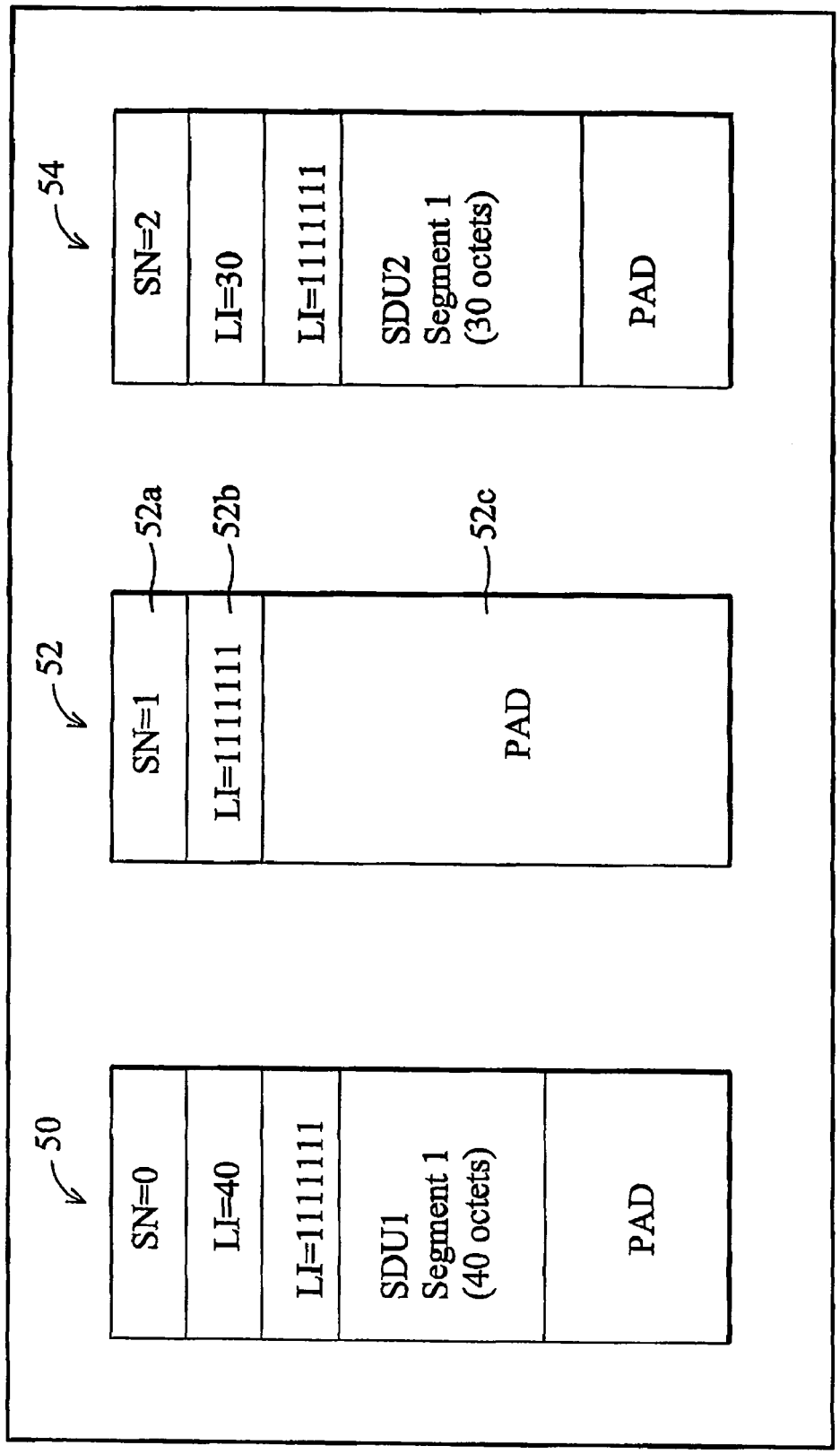
FIG. 5 is an exemplary diagram of two SDUs and one data-formatted padding PDU for transmission from a peer sender to a peer receiver.

By the second embodiment of the present invention, the data-formatted padding PDU cannot be transmitted when "SDU discard after MaxDAT number of transmissions" is configured. Thus, the deadlock problem as shown in FIG. 5 is avoided.

Furthermore, a third embodiment of the present invention to avoid potential deadlocks in a SDU discard procedure utilizes an explicit SDU discard signaling SUFI different from the conventional MRW SUFI to inform a peer receiver, wherein the SDU discard procedure uses the number of times of being scheduled for transmission of an AMD PDU as a trigger.

Figure 8:
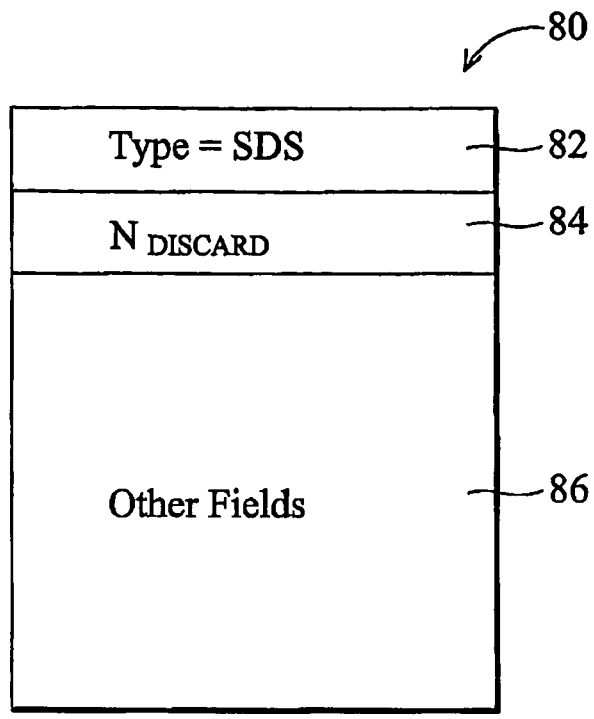
FIG. 8 is a diagram of the SDU discarded signaling SUFI utilized by an embodiment of the invention.

FIG. 8 is a diagram of the SDU discard signaling (SDS) SUFI utilized by this embodiment of the present invention. The SDS SUFI (80) signaling contains a Type field (82) which indicates the SUFI is a SDS SUFI (80), a $N_{DISCARD}$ field (84) which indicates the number of discarded SDUs and some other fields (86). The total number of discarded SDUs signaled by the SDS SUFI (80) can be calculated from the $N_{DISCARD}$ field (84) itself alone or from the $N_{DISCARD}$ field (84) together with other fields (86).

In this embodiment, a SDS SUFI is utilized and sent to the receiver in a SDU discard procedure. The $N_{DISCARD}$ field (84) facilitates synchronization of the number of SDUs transmitted by the sender and the number of SDUs received by the receiver. The $N_{DISCARD}$ field (84) can be implemented with various lengths or format depending on the actual requirements. In the example shown as in FIG. 5, $N_{DISCARD}$ field (84) can be set to indicate that the number of discarded SDUs is zero. Thus, the deadlock problem can be resolved.

Additionally, a fourth embodiment of the present invention to avoid potential deadlocks in a SDU discard procedure utilizes another explicit SDU discard signaling SUFI different from the conventional MRW SUFI to inform a peer receiver, wherein the SDU discard procedure uses the number of times of being scheduled for transmission of an AMD PDU as a trigger. The utilized explicit signaling is a modified move receiving window (MMRW) SUFI, which has a similar format as the conventional MRW SUFI (20) described in the background part.

Figure 9:
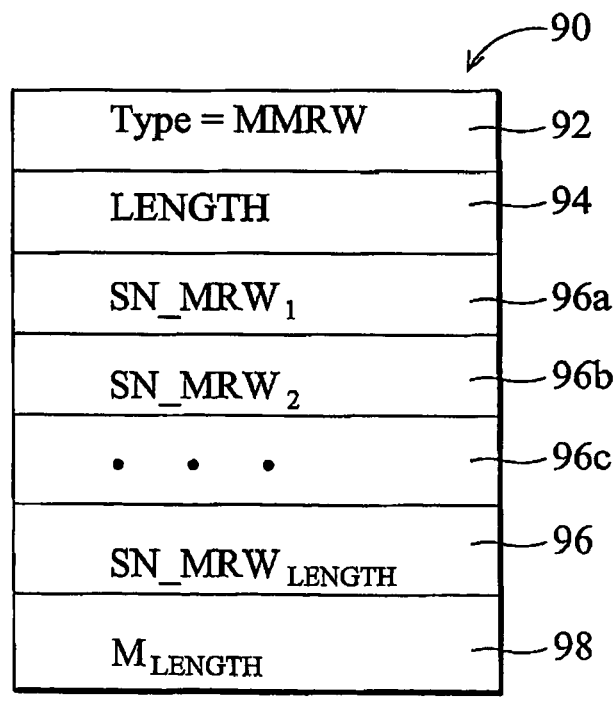
FIG. 9 is a diagram of the modified move receiving window SUFI utilized by an embodiment of the invention.

FIG. 9 is a diagram of the modified move receiving window (MMRW) SUFI utilized by this embodiment of the present invention. The MMRW SUFI (90) signaling contains a Type field (92) which indicates the SUFI is a MMRW SUFI (90), a LENGTH field (94), several front $SN\_MRW_i$ fields (96a, 96b, 96c) where i<LENGTH, a $SN\_MRW_{LENGTH}$ field (96) and a $M_{LENGTH}$ field (98). All fields in the MMRW SUFI (90) except the $SN\_MRW_{LENGTH}$ field (96) and the $M_{LENGTH}$ field (98) have the same meaning as the corresponding fields (22, 24, 26a) in the conventional MRW SUFI (20) and are not directly related to the present invention. The $M_{LENGTH}$ field (98) is used together with the $SN\_MRW_{LENGTH}$ (96) to indicate the end of the last RLC SDU to be discarded in the Receiver. For $M_{LENGTH}$ (98) with a value different from zero, the meaning of $M_{LENGTH}$ (98) is same as $N_{LENGTH}$ (28) in the conventional MRW SUFI (20), i.e., it indicates which "Length Indicator" in the AMD PDU with "Sequence Number" equal to $SN\_MRW_{LENGTH}$ (96) corresponds to the last RLC SDU to be discarded in the Receiver. However, $M_{LENGTH}=0$ indicates that the last RLC SDU ended in the AMD PDU with "Sequence Number" less than or equal to $SN\_MRW_{LENGTH}-1$ and that the first data octet in the AMD PDU with "sequence Number" equal to $SN\_MRW_{LENGTH}$ (96) is the first data octet to be reassembled next.

Figure 1:
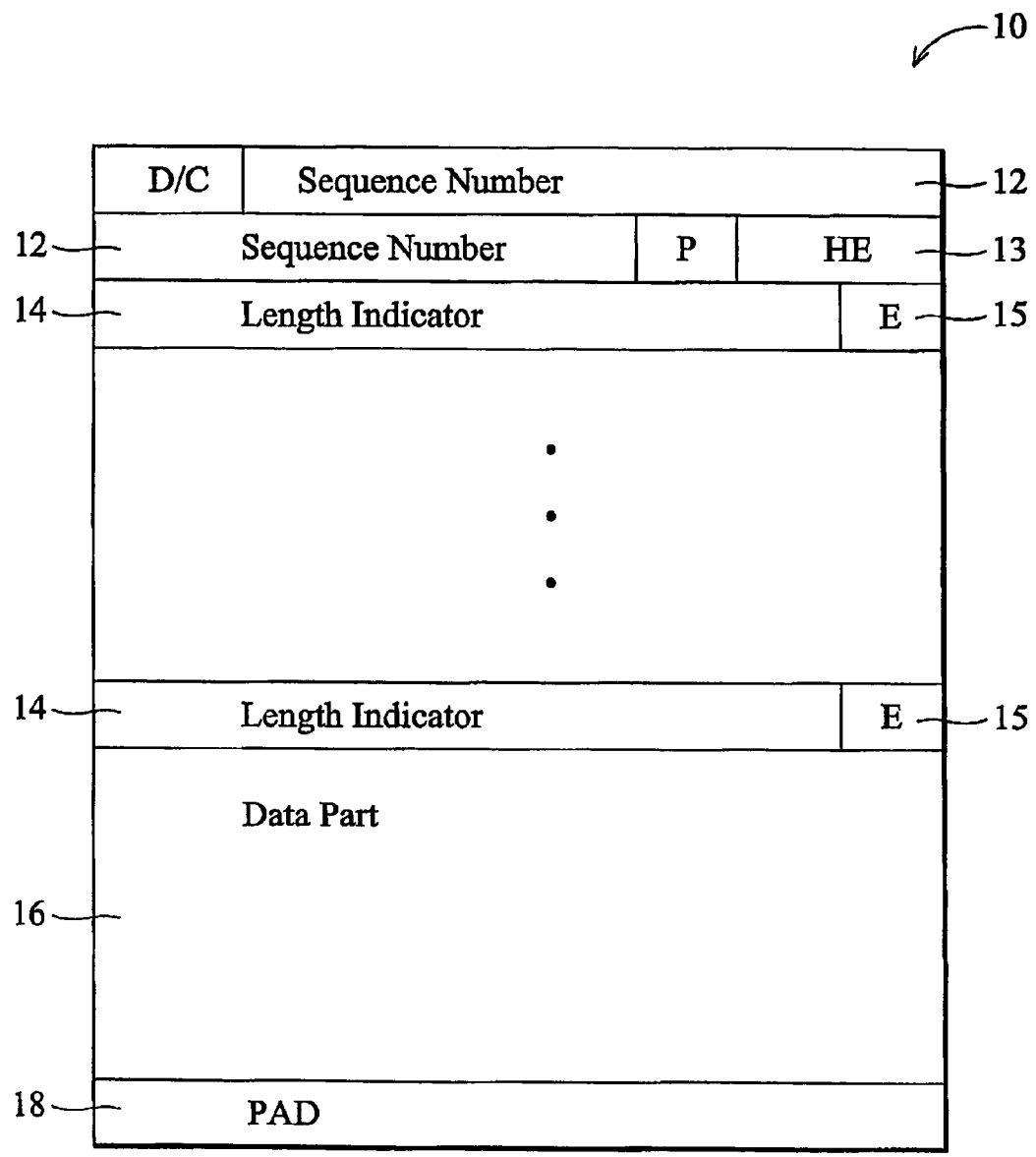
FIG. 1 is an exemplary diagram of a conventional AMD PDU.
Figure 2:
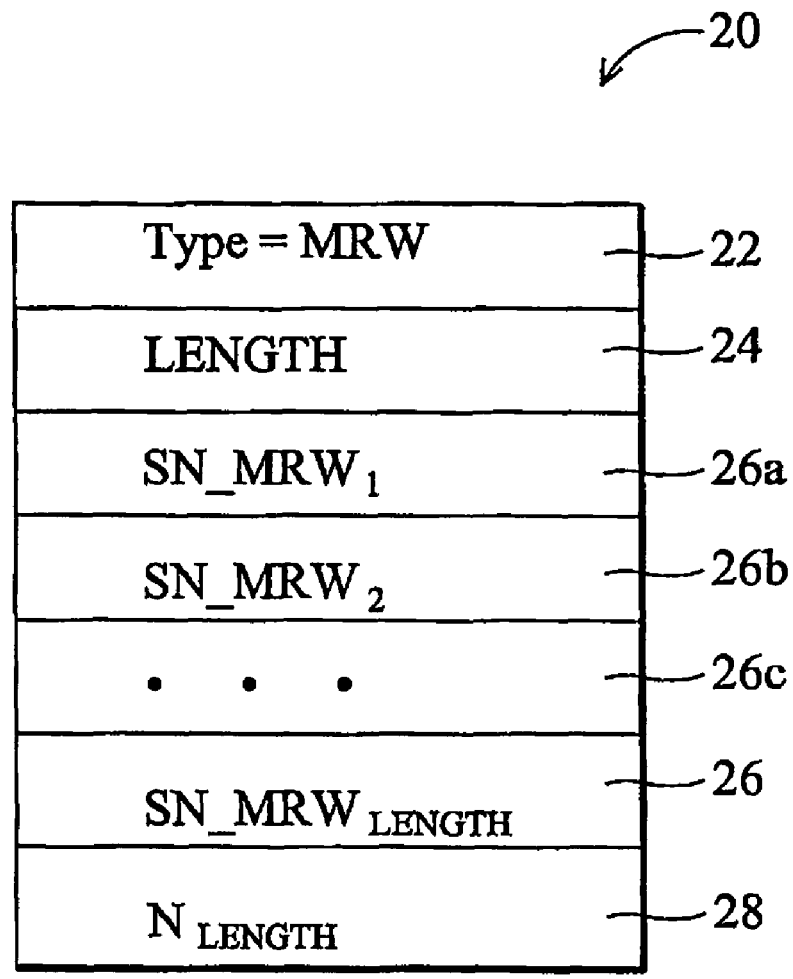
FIG. 2 is a diagram showing the format of a conventional MRW SUFI.
Figure 3:
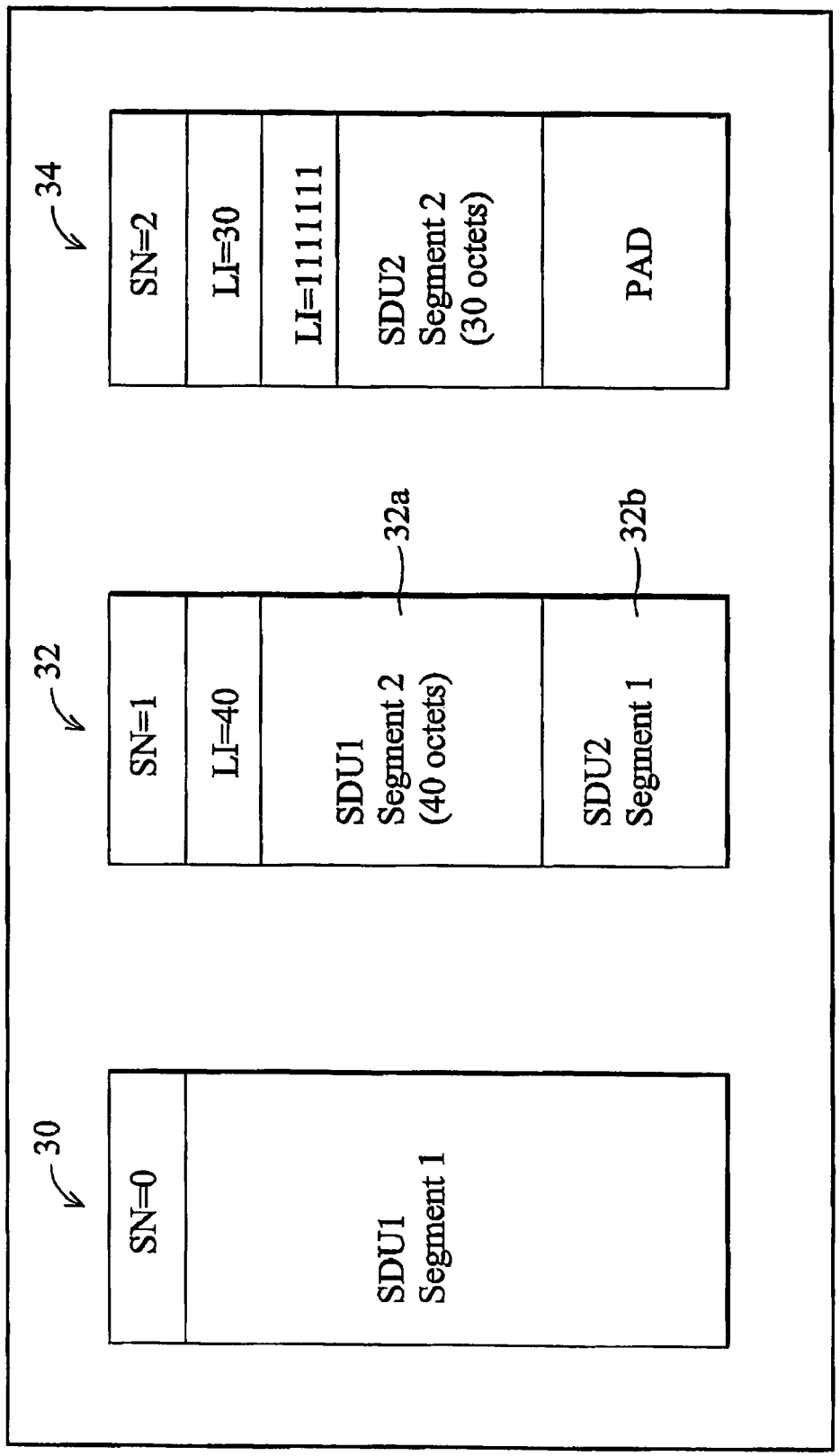
FIG. 3 is an exemplary diagram of two SDUs segmented and concatenated into three AMD PDUs for transmission from a peer sender to a peer receiver.
Figure 4:
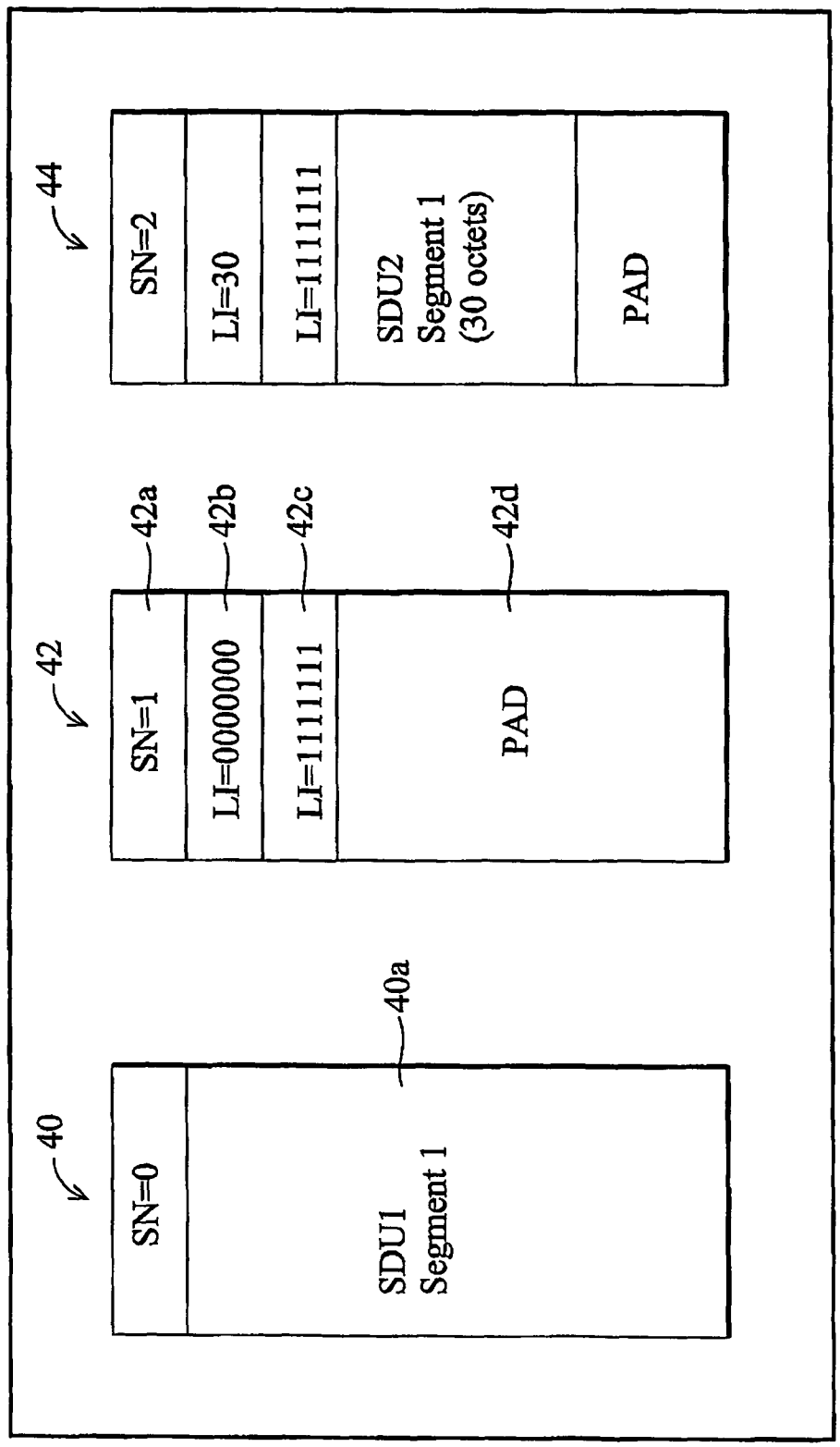
FIG. 4 is an exemplary diagram of two SDUs carried by three AMD PDUs for transmission from a peer sender to a peer receiver.

By the fourth embodiment, the sender can set the $SN\_MRW_{LENGTH}$ field (96) to 2 and the $M_{LENGTH}$ field (98) to 0 to signal the examples shown in FIG. 4 and FIG. 5 to the peer receiver to resolve the deadlock problems.

To sum up, embodiments of the present invention to avoid potential deadlock problems in a SDU discard procedure are disclosed. Thus, the inventive method can enhance the stability and the reliability of wireless communication related products.

While embodiments of the invention have been described by way of example and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for a Service Data Unit, called SDU hereafter, discard function, wherein the SDU discard function is triggered by a first maximum allowed number of transmissions of an acknowledged mode data protocol data unit, called AMD PDU hereafter, by a sender, wherein the transmission from the sender to a receiver in the wireless communications system is operated in acknowledged mode and the AMD PDU contains segments or length indicators, called LI hereafter, and wherein LI is used to indicate an end position of a SDU, the method comprising the steps of:

discarding a first set of SDUs by the sender if a number of times of a first AMD PDU scheduled for transmission reaches a second maximum allowed number; and executing a SDU discard with an explicit signaling procedure to inform the receiver of discarding the first set of SDUs, wherein the first set of SDUs contain a particular SDU and a particular LI carried by the first AMD PDU indicates that the particular SDU ends within a second AMD PDU, which is sequentially earlier and next to the first AMD PDU.

2. The method as claimed in claim 1, wherein the first maximum allowed number of transmissions of an AMD PDU is the second maximum allowed number minus 1.

3. The method as claimed in claim 1, wherein the SDU discard with an explicit signaling procedure further comprises the following steps of the sender:
  discarding a second set of SDUs that have segments or Length Indicators indicating the end of the SDUs in a set of not yet positively acknowledged AMD PDUs with "Sequence Number" equal to or sequentially earlier than the first AMD PDU; and
  discarding all AMD PDUs including segments of the second set of SDUs or Length Indicators indicating the end of the second set of SDUs, unless they also carry a segment of a SDU not contained in the second set of SDUs.

4. The method as claimed in claim 3, wherein at least one of the Length Indicators indicates a SDU ending within the second AMD PDU.

5. The method as claimed in claim 1, wherein the first set of SDUs further contains all SDUs that have segments or LIs in the first AMD PDU.

6. The method as claimed in claim 1, wherein the first AMD PDU includes padding but no SDUs or SDU segments.

* * * * *